(12) United States Patent
Strodtbeck et al.

(10) Patent No.: US 6,680,985 B1
(45) Date of Patent: Jan. 20, 2004

(54) ADAPTIVE QUADRATURE AMPLITUDE MODULATION DECODING SYSTEM

(75) Inventors: Andrew L. Strodtbeck, Marina del Rey, CA (US); Lauriston C. Wah, Manhattan Beach, CA (US); Susan E. Bach, Redondo Beach, CA (US)

(73) Assignee: Hughes Electronics Corporation, Irvine, CA (US)

( * ) Notice: Subject to any disclaimer, the term of this patent is extended or adjusted under 35 U.S.C. 154(b) by 709 days.

(21) Appl. No.: 09/639,446

(22) Filed: Aug. 15, 2000

(51) Int. Cl.[7] ................................................. H03D 1/24
(52) U.S. Cl. ....................................... 375/320; 375/232
(58) Field of Search ................................ 375/320, 261, 375/232; 329/347, 349, 353, 317, 318, 319, 345

(56) References Cited

U.S. PATENT DOCUMENTS

| | | | | | |
|---|---|---|---|---|---|
| 5,228,060 | A | * | 7/1993 | Uchiyama | 375/316 |
| 6,055,118 | A | * | 4/2000 | Du | 360/46 |
| 6,160,443 | A | * | 12/2000 | Maalej et al. | 329/304 |

* cited by examiner

*Primary Examiner*—Stephen Chin
*Assistant Examiner*—Kevin Kim
(74) *Attorney, Agent, or Firm*—Terje Gudmestad (57) ABSTRACT

An adaptive quadrature amplitude modulation ("QAM") decoding system for use in, for example, high speed, bandwidth efficient QAM communication systems includes a circuit that adaptively adjusts gain and voltage bias and provides adaptive equalization feedback based on the same signal used to decode the QAM symbols.

18 Claims, 8 Drawing Sheets

ADAPTIVE QUADRATURE AMPLITUDE MODULATION DECODING SYSTEM

FIELD OF THE INVENTION

The invention relates generally to electronic decoding systems and, more particularly, to an adaptive quadrature amplitude modulation (QAM) decoding system.

BACKGROUND OF THE INVENTION

The need for high speed methods to efficiently and reliably transmit and receive data has long been known. In particular, there is a known need to develop multi-gigabit per second satellite links with bandwidth efficiencies of three bits per second per Hertz or greater at acceptable bit error rates. Quadrature amplitude modulation ("QAM") is the most likely modulation technique to be able to reliably deliver data at such a high rate of transmission. Potential applications of a simple QAM decoding circuit, at high (or lower) transmission rates, include, for example, higher throughput UHF dissemination links and terrestrial broadcasting of digital (e.g., compressed) television signals or high definition television signals.

QAM is well known in the art. In general, bits are used to create individual "symbols" which fall into different sections of a "constellation." The minimum precision or bit width used when converting a signal from analog to digital is determined by the modulation size, i.e. the number of bits/symbol. For example, 16 QAM (4 bits/symbol) has four voltage levels on each axis (the I and Q axes) and requires a two bit (or four level) analog-to-digital converter to decode each of the I and Q components. In 16 QAM, the 2-bit outputs of the A/D converters are analyzed to determine the location of a symbol in the constellation. Thus, in 16 QAM, the most significant bit from the analog-to-digital (A/D) converter indicates if the position of the symbol in question is greater than zero or less than zero. A value of one indicates that the symbol is greater than zero while a value of zero indicates that the symbol is less than zero. The second significant bit indicates whether the symbol is above or below the mid-point between the upper and lower thresholds. If the second significant bit is above the mid-point between the upper and lower thresholds, the second significant bit value will be one, while a value of zero indicates that the symbol is less than the mid-point between the upper and lower thresholds.

Figure 5:
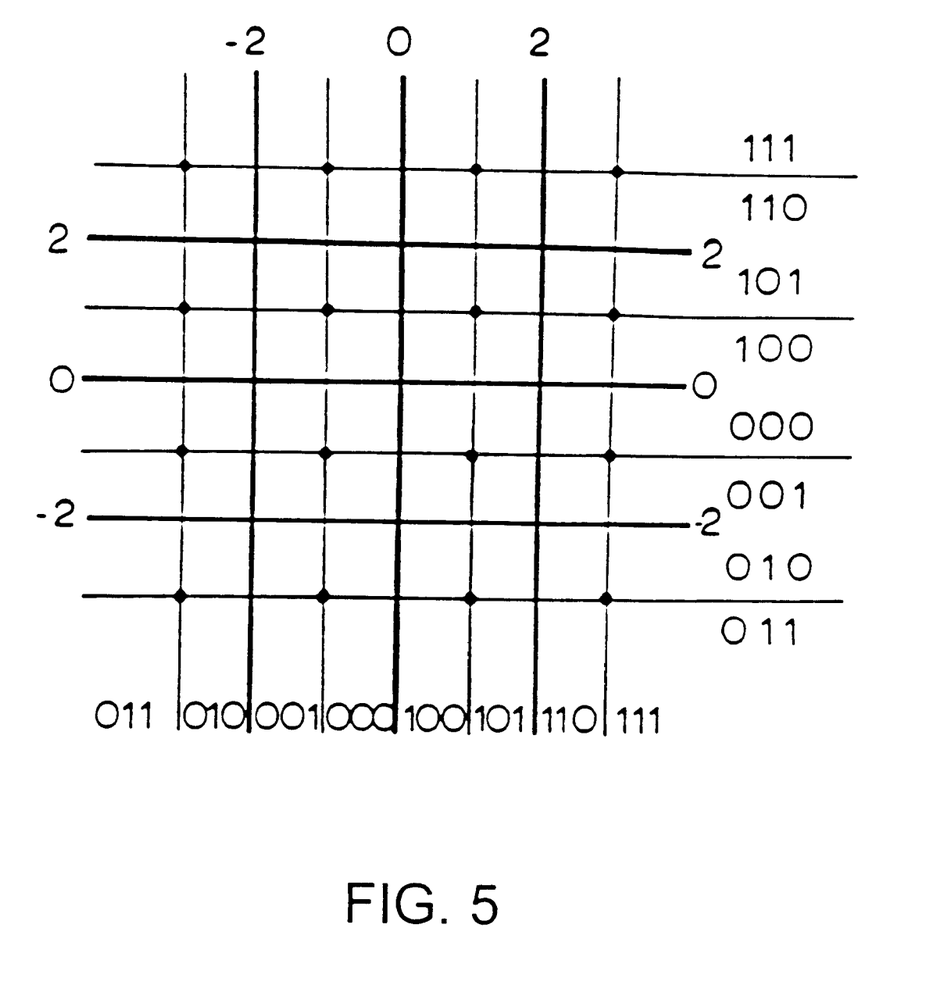
FIG. 5 is an illustration of a sample 16 QAM constellation.

A sample 16 QAM constellation is illustrated in FIG. 5 which shows that the available digital space (both imaginary and real space) is divided into 16 areas (separated by bold lines). As is known, a symbol is decoded into bits based on the areas into which the I and Q components fall.

Unfortunately, there have been significant problems which have hindered the development of QAM at very high transmission rates, including problems caused by voltage bias errors, gain errors and channel distortions. In particular, voltage bias errors and gain errors plague high speed QAM circuits. Past methods of controlling voltage bias and gain error required great care in the design of compensation circuits and, particularly, in the temperature compensation of these circuits. Furthermore, past methods of decision-making used to compensate for voltage bias errors and gain errors often used sub-sampled (high resolution) analog-to-digital converters or multiple comparators, both of which are relatively inefficient. Still further, past voltage bias and gain compensation circuits were not integrated with the equalizer circuits, resulting in unnecessarily complex compensation circuits which were difficult to build.

Equalization is typically necessary to compensate for channel distortions introduced by band limiting atmospheric distortions and general non-ideal filtering, which causes intersymbol interference. A transversal (e.g., tapped delay line or nonrecursive) equalizer is a common device used for equalization in high transmission rate systems. A transversal equalizer can be described as a tapped delay line where each tap output is passed through an adjustable gain and phase shift and is then summed with the other tap outputs. The gain and phase shift of each tap output is determined by, for example, a zero forcing algorithm. In such a system, the current and past values of a received signal are linearly weighted by equalizer coefficients (tap gains) and are summed to produce the output. In a zero forcing equalizer ("ZEF"), the equalizer coefficients are chosen to force samples of a combined channel and equalizer impulse response to zero at all but one (i.e., the main path) of a set of spaced instants in the equalizer.

Figure 1:
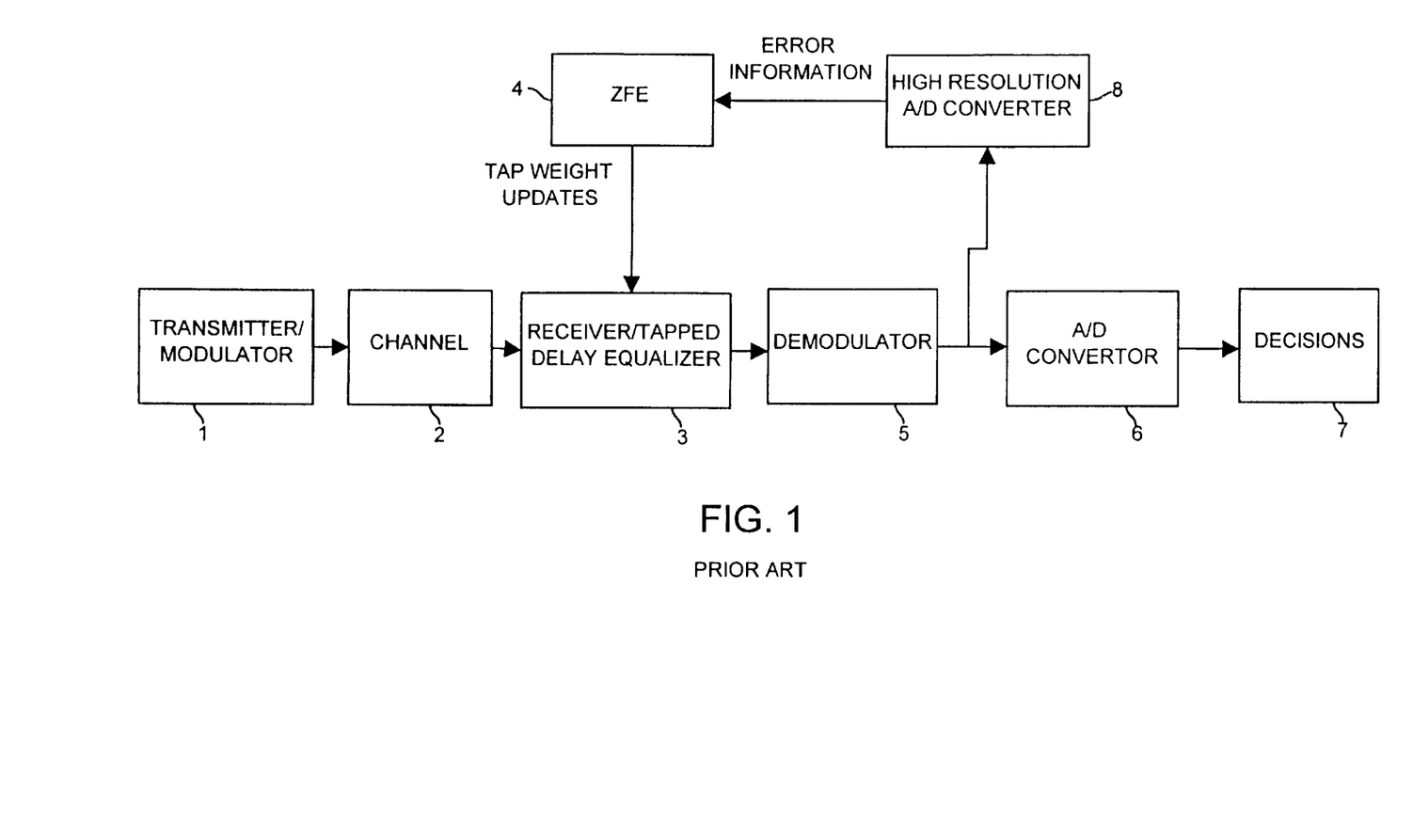
FIG. 1 is a block diagram of a prior art QAM decoding system.

FIG. 1 illustrates a known prior art QAM decoding system. In this system, a transmitter 1 converts a digital signal to symbols, modulates the symbols onto a carrier signal and transmits the modulated carrier signal through a channel 2 to a receiver/tapped delay line equalizer 3. The tapped delay line equalizer 3 uses tap weights received from a ZFE 4 to equalize the signal. The equalized signal is then communicated to a demodulator 5 which converts the signal to baseband and communicates the baseband signal to an analog-to-digital (A/D) converter 6. The output of the A/D converter 6 is then communicated to a decision unit 7 which decodes the symbols received using, for example, the constellation of FIG. 5. In addition, the baseband signal from the demodulator 5 is communicated to a high resolution A/D converter 8 which produces a high resolution error signal. The output of the high resolution A/D converter 8 is communicated as error information to the ZFE 4 which, in turn, uses the high resolution error signal to calculate tap weight adjustments which are then communicated to the tapped delay line equalizer 3. The tapped delay line equalizer 3 uses the tap weight adjustments to equalize the circuit in a known manner.

While intersymbol interference caused by linear distortions can be corrected through equalization, current methods of equalization are relatively slow, inefficient and consume a lot of power. Further, known methods of equalization are not integrated with gain error and voltage bias compensation methods and, as a result, these known equalization methods typically fail to take into account errors beyond the chosen feedback point. In particular, in the system of FIG. 1, the decision circuit 7 makes symbol decoding decisions based on the output of the A/D converter 6 while the ZFE 4 makes equalizer decisions based on the output of the A/D converter 8, which are different A/D converters. As a result, the transfer function of the A/D converter 6 is not taken into account in the ZFE 4 and, likewise, the transfer function of the A/D converter 8 is not taken into account by the decision circuit 7, leading to a mismatch between the symbol decoding and equalizer functions. This, in turn, can lead to errors in symbol decoding.

SUMMARY OF THE INVENTION

An adaptive quadrature amplitude modulation ("QAM") decoding system for use in, for example, high speed, bandwidth efficient QAM communication systems includes a circuit that adaptively adjusts gain and voltage bias and provides adaptive equalization feedback based on the same signal used to decode the QAM symbols. In one embodiment, the QAM decoding system minimizes gain errors, voltage bias errors and provides adaptive equalization feedback parameters for use in an equalizer such as in a zero forcing equalizer ("ZFE").

To minimize gain error, the system analyzes a specific significant bit in a sequence of output bits provided by an analog-to-digital converter used to perform decoding function, calculates a new long term average of the specific significant bit (including the most recent significant bit output by the analog-to-digital converter), and determines if the new long term average of the specific significant bit is greater than a desired value, which, for example, may be the mean between the possible values. The system adjusts the gain down if the long term average of specific significant bits is greater than the desired value (or range of values), adjusts the gain up if the long term average of specific the significant bit is less than the desired value (or range) and repeats these steps to adaptively minimize gain errors.

To correctly set voltage bias, the system executes a comparison function on two specific bits produced by the analog-to-digital (A/D) converter used to perform symbol decoding functions, calculates a new long term average of comparison function results (including the most recent result of the comparison function), and determines if the long term average of comparison function results is greater than a specific value or range of values. This method increases the voltage bias if the long term average of the comparison function results is less than the specific value (or range), and decreases the bias if the comparison function result is greater than the specific value (or range). The method then repeats these steps to adaptively set the voltage bias.

To adaptively equalize, the system extracts information from the analog-to-digital converter used to make symbol decoding decisions and uses this information to determine the correlation between errors within the main transmission path within the equalizer and the signal associated with a number of time delayed paths within the equalizer. The correlation values are then used as offsets to tap weights within the equalizer.

DESCRIPTION OF THE PREFERRED EMBODIMENTS

Figure 2:
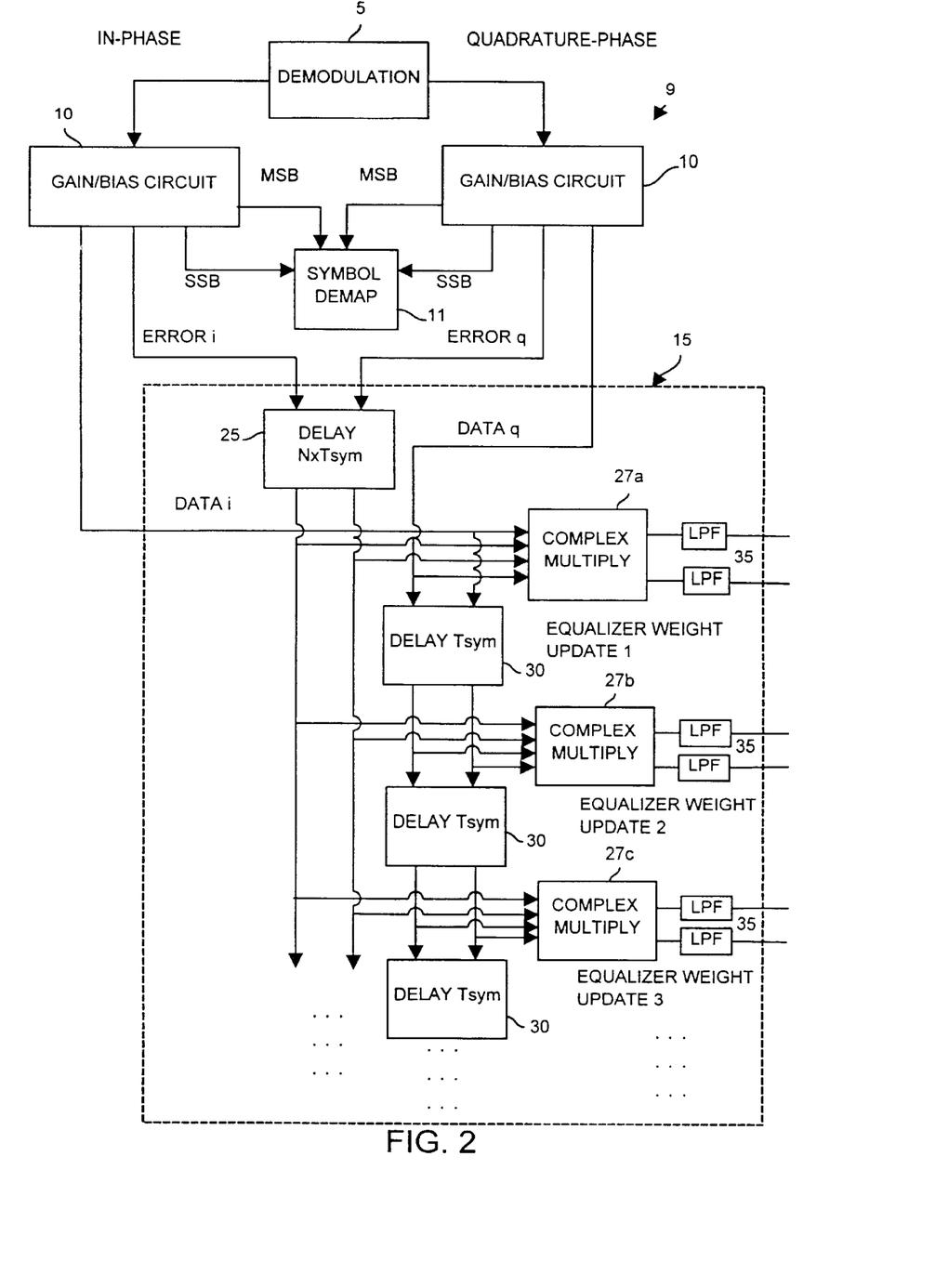
FIG. 2 is a block diagram of a QAM decoding system constructed in accordance with the teachings of the invention.

A quadrature amplitude modulation ("QAM") decoding circuit 9 constructed in accordance with the invention is shown in FIG. 2. Although a 16 QAM decoding circuit is described in the following discussion, persons of ordinary skill in the art will appreciate that the present invention is not limited to 16 QAM decoding devices. To the contrary, the QAM decoding circuit disclosed herein may use any bit level (e.g., 4, 8, 32, etc.) without departing from the scope of the invention.

Generally speaking, the QAM decoding circuit 9 replaces the analog-to-digital (A/D) converter 6 and the feedback loop (i.e., the A/D converter 8 and the ZFE 4) of FIG. 1. More particularly, the QAM decoding circuit 9 provides gain and voltage bias compensation as well as equalization based on the same data (i.e. the signal output by the same A/D converter) that is used by a symbol demap circuit to make symbol decoding decisions. In this manner, the compensation decisions are made using the same signals used to make the symbol decoding decisions, which provides for better coordination between symbol decoding and compensation. In general, the QAM decoding circuit 9 includes two gain/bias compensation circuits 10 coupled to a symbol demap circuit 11 and to an equalizer weight calculation circuit 15. The gain/bias compensation circuits 10 operate to control gain errors and bias errors within the I and Q channels and the equalizer weight calculation circuit 15 adaptively computes weight updates for the equalizer 3 of FIG. 1, to thereby compensate for intersymbol interference ("ISI").

Figure 3:
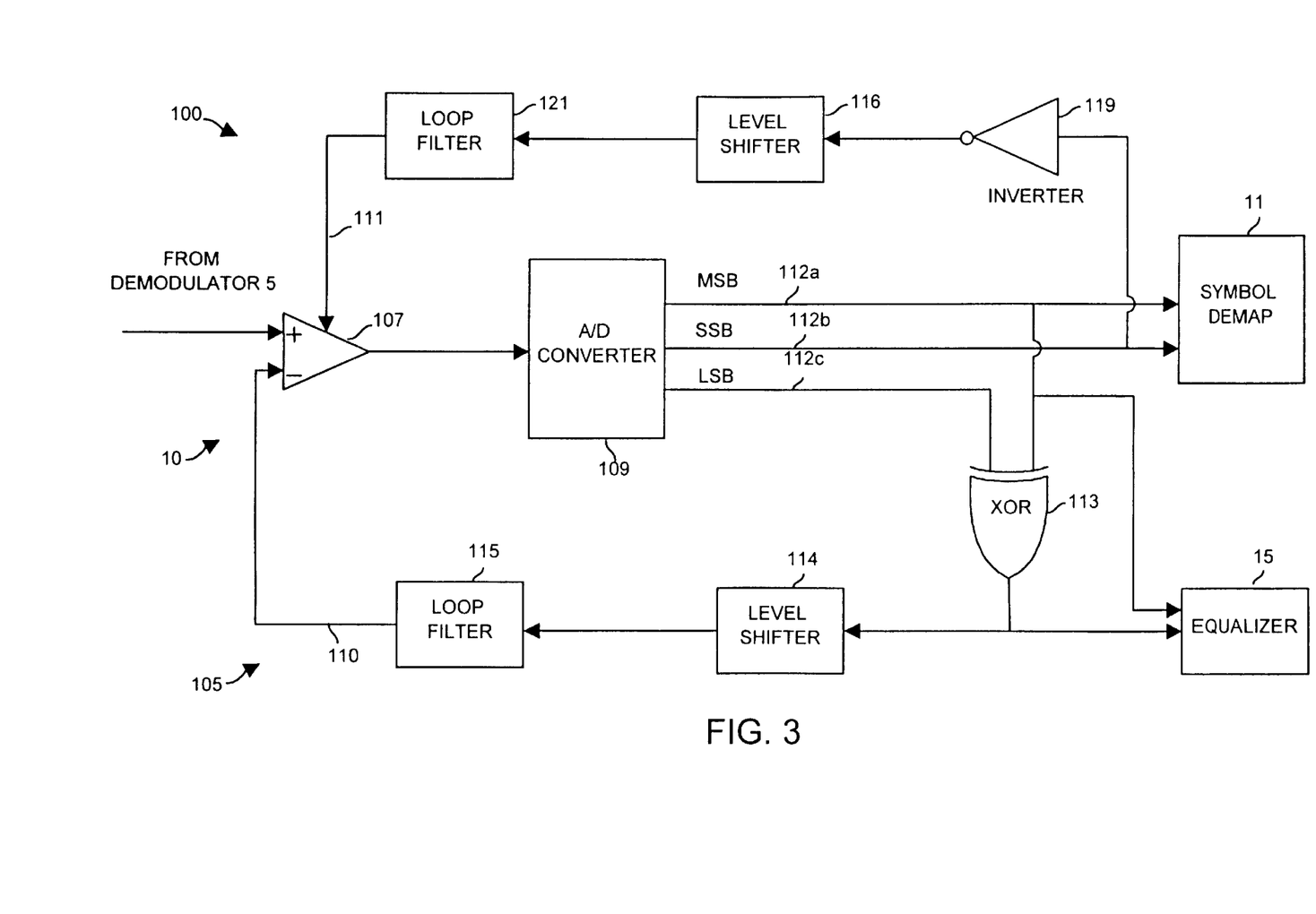
FIG. 3 is a block diagram of a gain/bias compensation circuit of the QAM decoding system of FIG. 2.

As illustrated in FIG. 2, both an in-phase (I) portion and a quadrature-phase (Q) portion of the signal from the demodulator 5 (FIG. 1) are communicated to separate gain/bias compensation circuits 10, one of which is illustrated in more detail in FIG. 3. Each of the gain/bias compensation circuits 10 digitizes the incoming signal using a simple A/D converter, performs gain compensation and voltage bias compensation on the signal and outputs first and second significant bits to a symbol demap circuit 11. Each of the gain/bias compensation circuits 10 also outputs error signals (ERROR i and ERROR q) and data signals (DATA i and DATA q) to the equalizer weight calculation circuit 15.

Generally speaking, the equalizer weight calculation circuit 15 determines the correlation between the error within the decoded signal (i.e. the main path signal in the equalizer 3) and the signal decoded from each of a number of signal paths (time delays) other than the main signal path in the equalizer 3 to determine tap weights for the tapped delay line 3. To this effect, a delay circuit 25 delays the error signals (ERROR i and ERROR q) from the gain/bias compensation circuits 10 and communicates the resultant delayed error signals to a series of complex multiplication units 27. In one embodiment, the delay introduced by the delay circuit 25 is determined as the product of N, a chosen delay factor representing the delay associated with the main signal path within the equalizer 3 on which symbol decoding is performed, and the time to receive one symbol ($T_{SYM}$), although other delays can be used instead. Of course, the signal delay factor N is chosen with consideration of the main path anticipated to be used and can be changed, if desired.

In addition, each of the series of complex multiplication units 27 receives the DATA i and DATA q signals produced by the gain/bias compensation circuits 10 or delayed versions thereof which have been delayed by one or more delay units 30. In particular, the first complex multiplication unit 27a receives the DATA i and DATA q without a delay, while subsequent complex multiplication units 27b and 27c receive the DATA i and DATA q signals subject to an increasing delay produced by the delay circuits 30. The output of each of the delay units 30 represents the communication signal as sent through a signal path other than the main signal path. Thus, as shown in FIG. 2, the second complex multiplication unit 27b receives the DATA i and DATA q signals after a first delay of $T_{SYM}$ which, in one embodiment, is the time to receive one symbol (although other delay times can be used). Likewise a third complex multiplication unit 27c receives the DATA i and DATA q signals after a delay time of twice the symbol time ($T_{SYM}$.) Additional complex multiplication units 27 could be added to receive the DATA i and DATA q signals after additional delays of time $T_{SYM}$.

Generally speaking, the complex multiplication units 27 calculate feedback parameters or tap weights which are used by any known equalizer. Thus, while in the embodiment of FIG. 2, three complex multiplication units 27 are used, more or less complex multiplication units 27 may be used depending on the number of tap weights in the equalizer 3. In particular, the complex multiplication units 27 perform a complex multiplication operation to multiply the delayed DATA i and DATA q signals of a main path signal and the ERROR i and ERROR q signals of the main path signal to determine the instantaneous correlation between these signals. Low pass filters 35 then average the instantaneous correlation values to determine a long term average correlation for each of the signals within a non-main signal path with the error in the main signal path. The long term average correlations are then used to change the tap weights in the equalizer 3 in known manners.

Referring now to FIG. 3, one embodiment of the gain/bias compensation circuit 10 of FIG. 2 is depicted in more detail. The gain/bias compensation circuit 10 includes a gain compensation circuit 100 and a voltage bias compensation circuit 105, both of which use the same voltage controlled differential amplifier 107 and analog-to-digital converter 109. Preferably, the gain compensation circuit 100 is integrated as an embedded circuit with the voltage bias compensation circuit 105 and the embedded equalizer weight calculation circuit 15 (FIG. 2) in a single adaptive QAM decoding circuit.

During operation, the I or Q signal from the demodulator 5 or other detection filter is communicated to the positive input of the voltage controlled differential amplifier 107. The differential amplifier 107 compares this signal with a feedback or voltage bias signal on a line 110 and amplifies the difference of the two signals based on a gain control signal on a line 111. The output of the voltage controlled differential amplifier 107 is communicated to an A/D converter 109 which, in this case (16 QAM), produces a three bit digital signal instead of a 2 bit signal as would usually be the case for a 16 QAM symbol decoding circuit. It will be understood that the A/D converter 109 needs to have at least one additional bit resolution over that normally needed for symbol decoding. The most significant output bit (MSB) and the second significant bit (SSB) from the A/D converter 109 are communicated to the symbol demap circuit 11 via lines 112a and 112b. In addition, the MSB of the A/D converter 109 is communicated to the equalizer weight calculation circuit 15 (FIG. 2) as the DATA i or the DATA q signal. The MSB is also communicated to an XOR unit 113 along with the least significant output bit (LSB) of the A/D converter 109. The XOR unit 113 exclusively 'or's the LSB and the MSB to produce an XOR output that is communicated to the equalizer weight calculation circuit 15 as an error signal (i.e. the ERROR i or ERROR q signal). In addition, the output of the XOR unit 113 is communicated to a level shifter 114, which is part of the voltage bias compensation circuit 105.

Generally, the voltage bias compensation circuit 105 is provided to keep individual sections of the QAM signal constellation (such as that of FIG. 5) centered around a specific point. In particular, the voltage bias compensation circuit 105 tries to assure that the same number of points within any particular section of the constellation of FIG. 5 fall above the midpoint of that section as below the midpoint of that section. In one embodiment, the level shifter 114 converts the output of the XOR unit 113 (which is a digital zero or one) to a consistent positive or negative voltage such as +10 volts or −10 volts (for example, a binary one would be converted to +10 volts and a binary zero would be converted to −10 volts) so that the midpoint between the voltages is, for example, zero. The output of the level shifter 114 is then communicated to a loop filter 115. The loop filter 115 creates a long term average of the output of the. level shifter 114 and determines if the new long term average of the output of the level shifter 114 is greater than or less than a desired value or range. If the long term average of the output of the level shifter 114 is less than a predetermined value (or range), the loop filter 115 increases the voltage bias on line 110 to the differential amplifier 107. Conversely, if the long term average of the output of the level shifter 114 is greater than a desired value (or range), the loop filter 115 decreases the voltage bias. The loop filter 115 result, of course, can be of any desired resolution.

Figure 7:
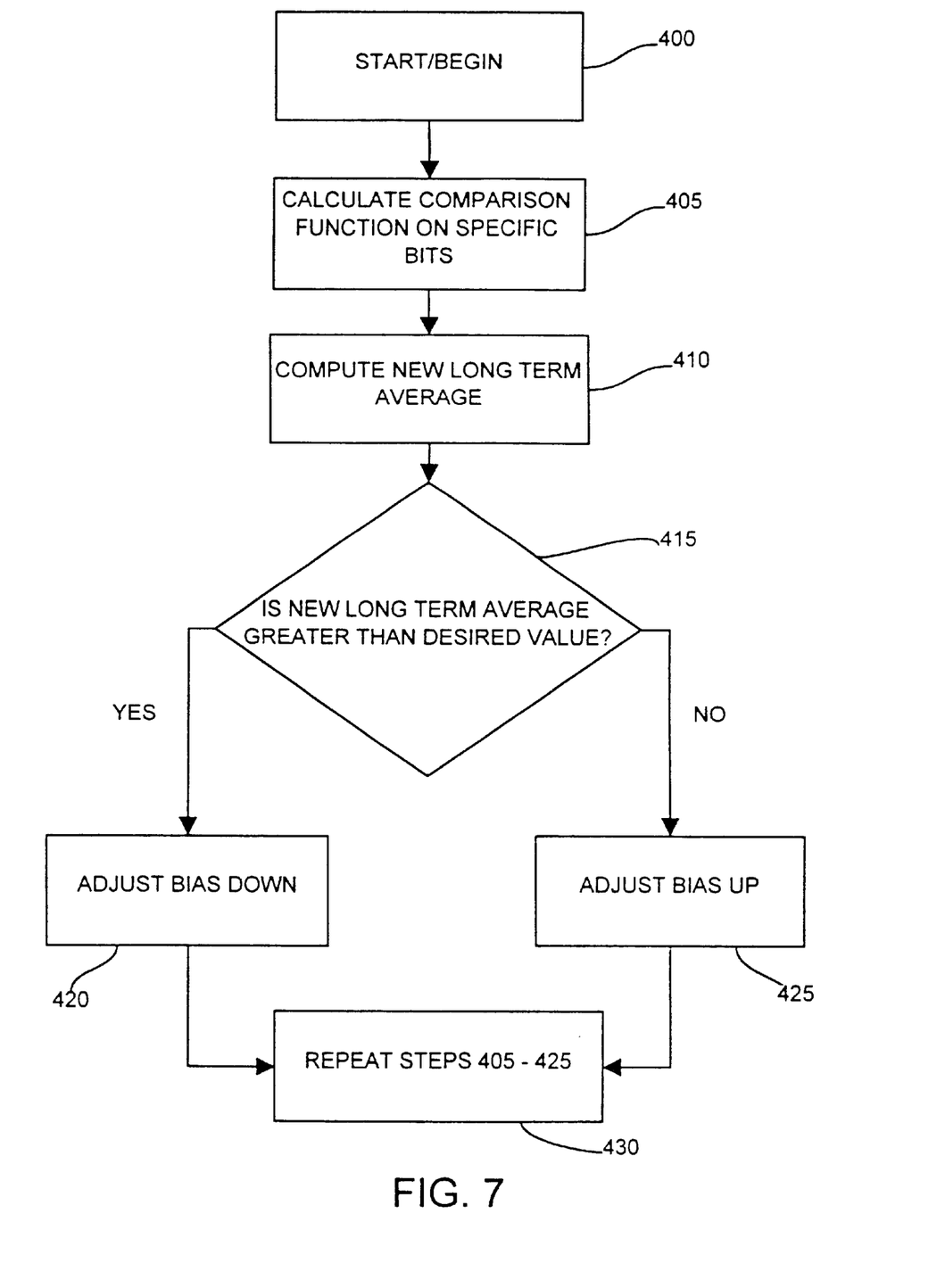
FIG. 7 is a flow chart illustrating a voltage bias compensation method.

Voltage bias can also be controlled through software methods. A sample voltage bias compensation method is depicted in FIG. 7. Here, a step 405 performs a comparison function on two output digits of the A/D converter on which symbol decoding is performed. In 16 QAM, for example, the comparison function used is XOR and the first significant bit and the least significant bit are 'exclusively ORed' to provide an error signal. However, other comparison functions can be used, as will be understood by those skilled in the art. Also, other bits can be used to adjust the QAM constellation as will be understood by those skilled in the art. A step 410 computes a new long term average of the comparison function result and previous comparison function results including the most recent XOR result. A step 415 then analyzes the new long term average value to determine if the long term average value is greater than a desired value (or range). If the long term average is greater than the desired value (or range), a step 420 decreases the voltage bias. If the long term average is less than the desired value (or range), a step 425 increases voltage bias. The method then repeats the steps 405–425 to compute a new voltage bias.

Referring again to FIG. 3, the gain compensation circuit 100 is provided to keep the decoded symbols centered as best as possible between upper and lower levels of a QAM signal constellation, or centered between other specified values, and to provide feedback for adaptive equalization purposes. In particular, the gain compensation circuit 100 attempts to keep the same number of decoded symbols falling within the middle two sections (where the SSB is zero) of the constellation (on each axis) of FIG. 5 as in the outer two sections (where the SSB is one). It will be understood that the 3-bit output of the A/D converter 109 is illustrated along the edges of the constellation of FIG. 5 to indicate appropriate symbol and error decoding. In the gain compensation circuit 100, the SSB from the A/D converter 109 is communicated to an inverter 119. The inverter 119 inverts this signal and the inverter output 119 is communicated to a level shifter 116. The level shifter 116 converts the signal from the inverter 119 into a consistent positive or negative voltage amount such as +10 volts or −10 volts so that the midpoint between the two voltages is, for example, zero. The output of the level shifter 116 is communicated to a loop filter 121 which calculates a new long term average of the SSBs including the most recent level shifter result. If the new long term average as determined by the loop filter 121 is greater than a desired value (or above a desired range), the loop filter 121 adjusts the gain signal provided on line 111 down. However, if the new long term average of the SSBs is less than a desired value (or range) the loop filter 121 adjusts the gain signal on line 111 up.

Figure 6:
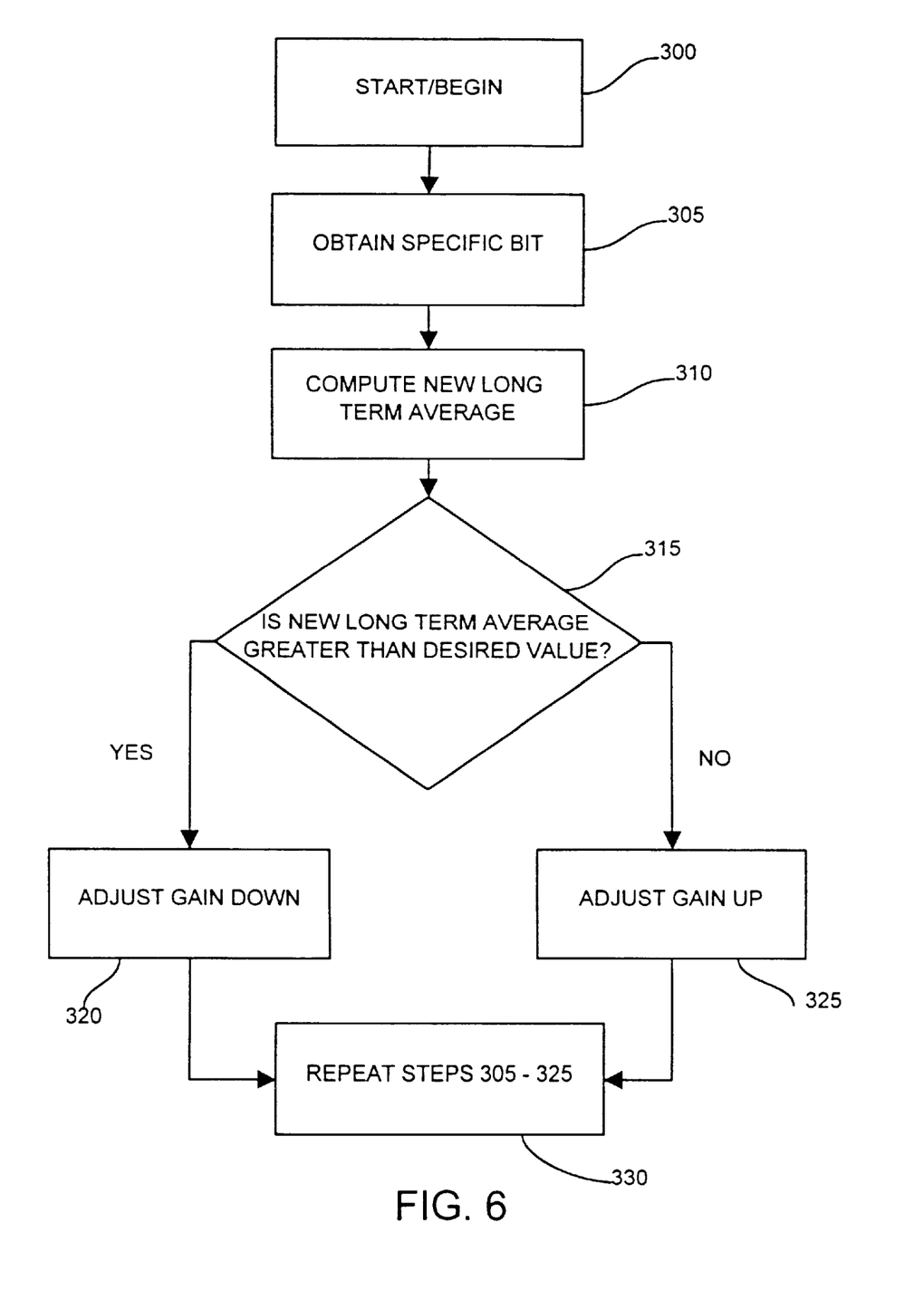
FIG. 6 is a flow chart illustrating a gain compensation method.

Gain errors also can be controlled through software methods. FIG. 6 provides an example flow chart of the steps accomplished by one embodiment of an adaptive gain compensation method. To compensate for gain errors, the method assures that a specific significant bit (such as the MSB or the LSB) of the A/D converter used to perform symbol decoding averages toward a desired value between the upper and lower threshold values. The specific bit is of the same significance level in each pass through the method. For example, in 16 QAM, the second significant bit is analyzed in each pass through the method. Preferably, the specific value to which the method averages toward is the mean between the upper and lower threshold values, which results in the QAM constellation being centered between the upper and lower thresholds.

As depicted in FIG. 6, the method starts the analysis at step 300. A step 305 obtains a specific significant bit of the output of the A/D converter used to perform symbol decoding and a step 310 computes a new long term average of the values of the specific significant bit (including the most recent significant bit). A step 315 then analyzes the new long term average of the specific significant bit and, if the new long term average is above a desired value (or range), a step 320 adjusts the gain downward. If the new long term average is below the desired value (or range), a step 325 adjusts the gain higher. The steps 305, 310, 315 and 325 are repeated so as to keep an acceptable level of gain to thereby prevent gain errors.

Referring again to FIG. 1, the equalizer weight calculation circuit 15 determines if errors such as intersymbol interference ("ISI") exist. ISI signals may be caused by, for example, delayed versions of the main signal through the channel as indicated above. The equalizer weight calculation circuit 15 attempts to minimize this error if it exists by correlating errors from the main path to delayed versions of the signal through the main path. The correlation is determined, in each case, by calculating the average complex product of the error associated with the main path signal to the delayed version of the main path signal.

Figure 4:
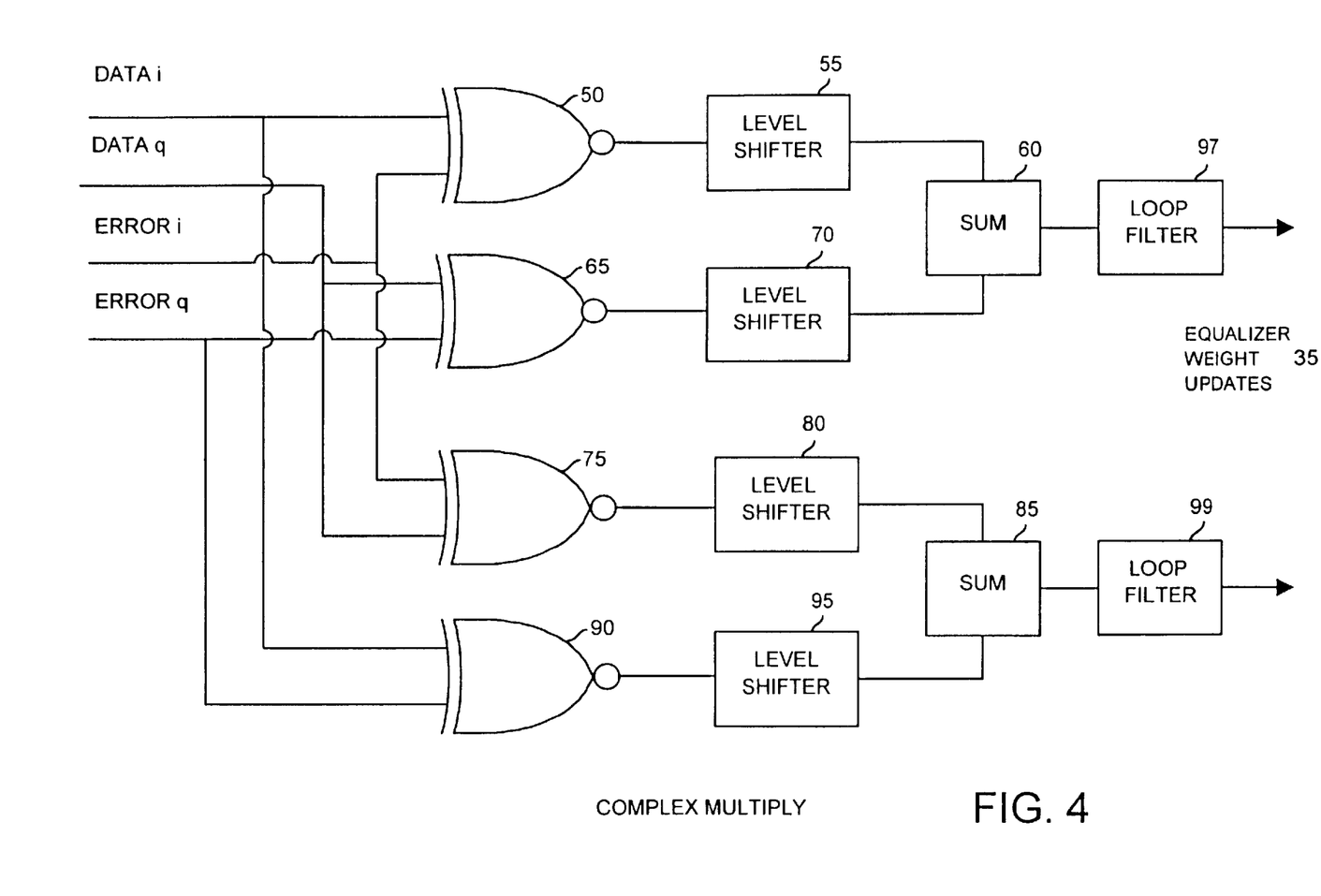
FIG. 4 is a block diagram of a complex multiplication circuit of FIG. 2.

FIG. 4 illustrates one method of performing the complex multiply of the circuit 27 of FIG. 2. To determine the in-phase component of the correlation, the complex multiply 27 receives the in-phase DATA i and in-phase ERROR i signal and communicates these signals to an NXOR ('not-exclusive OR') unit 50. The output of the NXOR unit 50 is communicated to a level shifter 55 which converts the output of the NXOR unit 50 (zero or one) to a consistent positive or negative voltage such as +10 volts or −10 volts. The output of the level shifter 55 is communicated to a first summation apparatus 60. In addition, the DATA q and ERROR q signals are communicated to an NXOR unit 65 and the output of the NXOR unit 65 is communicated to a level shifter 70 which converts the output of the NXOR unit 50 (zero or one) to a consistent positive or negative voltage. The level shifter 70 output is communicated to the first summation apparatus 60 and the output of the summation apparatus 60 (which represents the instantaneous real part of the complex multiplication) is communicated to the loop filter 97 (labeled 35 in FIG. 1). The loop filter 97 calculates a long term average of the output of the first summation apparatus 60 to thereby create the real part of a complex correlation value used to update one tap (or delay path) in the transversal filter of the equalizer 3.

To determine the quadrature-phase component of the correlation, the complex multiply 27 receives the quadrature-phase DATA q and in-phase ERROR i signal and communicates these signals to an NXOR unit 75. The output of the NXOR unit 75 is communicated to a level shifter 80 which converts the output of the NXOR unit 75 (zero or one) to a consistent positive or negative voltage such as +10 volts or −10 volts. The output of the level shifter 80 is communicated to a second summation apparatus 85. In addition, the DATA i and ERROR q signals are communicated to an NXOR unit 90 and the output of the NXOR unit 90 is communicated to a level shifter 95 which converts the output of the NXOR unit 90 (zero or one) to a consistent positive or negative voltage. The level shifter 95 output is communicated to the second summation apparatus 85 and the output of the summation apparatus 85 (which represents the instantaneous imaginary part of the complex multiplication) is communicated to the loop filter 99 (labeled 35 in FIG. 1). The loop filter 99 calculates a long term average of the output of the second summation apparatus 85 to thereby produce the imaginary part of a complex correlation value used to update one tap (or delay path) in the transversal filter of the equalizer 3.

In particular, the complex correlation values (the outputs from the loop filter 99 and loop filter 97) are used to adjust the gain and phase shift of the corresponding taps used by the equalizer 3, which may be, for example, a ZFE. One algorithm to adjust the gain and phase shift is to add to the current gain and phase shift a fraction of the amplitude and phase of the correlation value.

Figure 8:
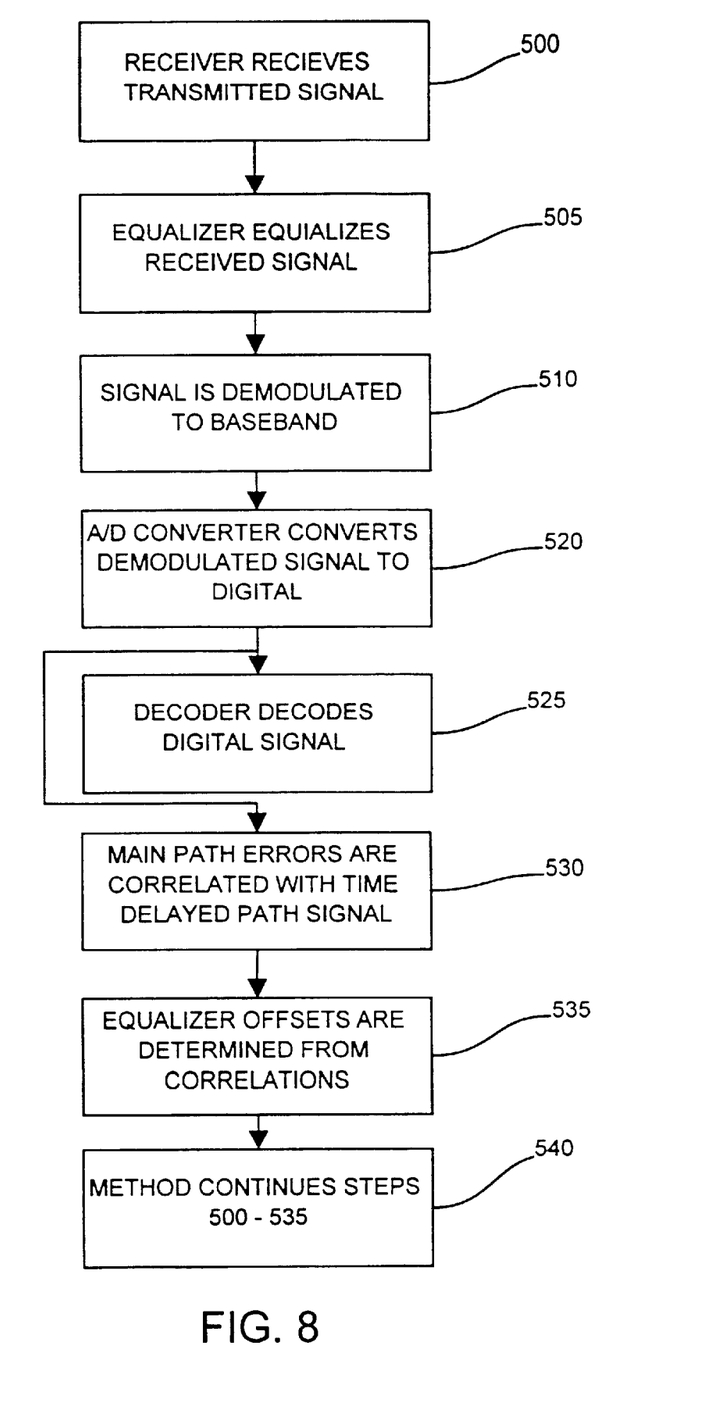
FIG. 8 is a flow chart illustrating an equalizer tap weight adjustment method.

Equalization can also be performed using software. The steps of a sample method to adjust equalization parameters is depicted in FIG. 8. The method begins at a step 500 where a signal is transmitted to a receiver. A step 505 uses a tapped delay algorithm in the receiver to equalize the incoming signal. A step 510 receives a signal from the equalizer and demodulates the signal. A step 520 converts the demodulated signal from analog to digital. A step 525 makes symbol decoding decisions based on the signals received from the step 520. A step 530 also receives the signals of step 520 and correlates the errors within the signals from the step 520 with time delayed versions of the signals by calculating a complex multiplication of the I and Q components of these signals. A step 535 uses the results of the complex multiplication to produce offsets to the equalizer tap weights and communicates these tap weight offsets to the ZFE in the receiver of steps 500 and 505. The method repeats the steps of 500–535 to continually equalize the incoming signal. Many other equalization methods that use feedback signals are well known to those skilled in the art and are acceptable for use in the present invention. Of course, the software illustrated in FIGS. 6, 7 and 8 may be stored in any desired manner such as in a ROM or RAM, an ASIC or other memory and may be implemented using any desired processor, such as a digital signal processor, microcontroller, an ASIC, etc.

Numerous modifications and alternative embodiments of the invention will be apparent to those skilled in the art in view of the foregoing description. Accordingly, this description is to be construed as illustrative only. The details of the structure and method may be varied substantially without departing from the spirit of the invention and the exclusive use of all modifications which are within the scope of the appended claims is reserved.

What is claimed is:

1. A quadrature amplitude modulation (QAM) decoding device for use in decoding a QAM signal comprising:
   an equalizer that equalizes the QAM signal using a plurality of tap weights to produce an equalized signal;
   a demodulator coupled to the equalizer that demodulates the equalized signal to produce a demodulated signal;
   an amplifier coupled to the demodulator that amplifies the demodulated signal based on a voltage bias and a gain factor;
   an analog-to-digital converter coupled to the amplifier and adapted to produce a digital signal;
   a symbol decoder coupled to the analog-to-digital converter and adapted to decode the digital signal;
   a gain compensation circuit coupled to the analog-to-digital converter and to the amplifier that sets the gain factor for the amplifier using the digital signal;
   a voltage bias compensation circuit coupled to the analog-to-digital converter and to the amplifier that sets the voltage bias for the amplifier using the digital signal; and
   an equalizer weight calculation circuit coupled to the analog-to-digital circuit and to the equalizer that calculates updates for the tap weights based on the digital signal.

2. The apparatus as set forth in claim 1, wherein the digital signal includes multiple bits, and the gain compensation circuit further comprises:
   an inverter coupled to one of the bits of the digital signal;
   a level shifter coupled to the inverter and adapted to produce a level shifter output; and
   a filter coupled to the level shifter and adapted to create a long term average of the level shifter output.

3. The apparatus as set forth in claim 2, wherein the filter increases the gain factor when the long term average is below a first threshold and decreases the gain factor when the long term average is above a second threshold.

4. The apparatus as set forth in claim 2, wherein the inverter is coupled to a second significant bit of the digital signal.

5. The apparatus as set forth in claim 1, wherein the voltage bias compensation circuit further comprises:
   an 'exclusive or' (XOR) unit coupled to the analog-to-digital converter;
   a level shifter coupled to the XOR unit and adapted to produce a level shifter output; and
   a filter coupled to the level shifter and adapted to create a long term average of the level shifter output.

6. The apparatus as set forth in claim 5, wherein the filter increases the voltage bias when the long term average is below a first threshold and decreases the voltage bias when the long term average is above a second threshold.

7. The apparatus as set forth in claim 5, wherein a most significant bit from the digital signal and a least significant bit from the digital signal are coupled to the XOR unit.

8. The apparatus as set forth in claim 7, wherein the XOR unit is adapted to produce an XOR output and the equalizer weight calculation circuit is coupled to the XOR unit and to the most significant bit of the digital signal and further comprises a complex multiply circuit that is adapted to determine a correlation between the XOR output and the most significant bit of the digital signal.

9. The apparatus as set forth in claim 7 further including a first delay unit coupled to the XOR unit, a series of second delay units coupled to the most significant bit of the digital signal, and a set of multiply circuits, wherein each of the set of multiply circuits is coupled to the first delay unit and to a different one of the series of second delay units.

10. A method of decoding a quadrature amplitude modulation (QAM) signal comprising the steps of:
    equalizing the QAM signal using a plurality of tap weights;
    demodulating the equalized signal to produce a demodulated signal;
    amplifying the demodulated signal based on a voltage bias and a gain factor to produce an amplified signal;
    converting the amplified signal to a digital signal;
    decoding the digital signal;
    setting the gain factor using the digital signal;
    setting the voltage bias using the digital signal; and
    determining updates for the tap weights using the digital signal.

11. The method as set forth in claim 10 wherein the digital signal includes bits and wherein the step of setting the gain factor using the digital signal further including the steps of inverting one of the bits of the digital signal to produce an inverter output, level shifting the inverter output to produce a level shifter output and filtering the level shifter output to create a long term average of the level shifter output.

12. The method as set forth in claim 11, wherein the step of setting the gain factor using the digital signal further includes the step of inverting the second most significant bit.

13. The method as set forth in claim 11, wherein the step of filtering the level shifter output further includes the steps of increasing the gain factor if the long term average of the level shifter output is below a first threshold and decreasing the gain factor if the long term average of the level shifter output is above a second threshold.

14. The method as set forth in claim 10, wherein the digital signal includes bits and wherein the step of setting the voltage bias using the digital signal further includes the steps of determining an 'exclusive or' (XOR) of a first bit of the digital signal and a second bit of the digital signal to produce an XOR output, level shifting the XOR output to produce a level shifter output and filtering the level shifter output to produce a long term average of the level shifter output.

15. The method as set forth in claim 14, wherein the step of setting the voltage bias using the digital signal further includes the step of determining the XOR output of a most significant bit and a least significant bit.

16. The method as set forth in claim 14, wherein the step of filtering the level shifter output to produce a long term average of level shifter outputs further comprises the steps of increasing the voltage bias if the long term average of the level shifter output is below a first threshold and decreasing the voltage bias if the long term average of the level shifter output is above a second threshold.

17. The method of claim 14, wherein the step of determining updates for the tap weights using the digital signal further includes the step of determining a correlation between the XOR output and most significant bit of the digital signal.

18. The method of claim 14, wherein the step of determining updates for the tap weights using the digital signal further includes the steps of delaying the XOR output by a first delay to produce a delayed XOR output, delaying the most significant bit of the digital signal by a series of second delay units to produce a series of delayed most significant bits and multiplying the delayed XOR output by each of the series of delayed most significant bits.

* * * * *